United States Patent [19]

Ammann et al.

[11] Patent Number: 4,538,969
[45] Date of Patent: Sep. 3, 1985

[54] EXHAUST-GAS TURBOCHARGER WITH A BEARING SYSTEM LOCATED BETWEEN THE TURBINE AND THE COMPRESSOR

[75] Inventors: Hansruedi Ammann, Oberentfelden; Hansulrich Hörler, Zürich, both of Switzerland

[73] Assignee: BBC Brown, Boveri & Company, Limited, Baden, Switzerland

[21] Appl. No.: 671,060

[22] Filed: Nov. 13, 1984

[30] Foreign Application Priority Data

Aug. 18, 1981 [CH] Switzerland .......................... 5324/81

[51] Int. Cl.³ .............................................. F04B 17/00
[52] U.S. Cl. .................................... 417/407; 417/409; 416/244 A
[58] Field of Search ........... 416/244 A, 244 R, 146 R, 416/146 A, 244 B; 417/405, 406, 407, 408, 409; 403/258, 259, 260, 365, 372, 345, 29, 30

[56] References Cited

U.S. PATENT DOCUMENTS

| | | | |
|---|---|---|---|
| 2,441,432 | 5/1948 | McGee | 416/244 A |
| 3,019,039 | 1/1962 | Clavell | 403/30 |
| 3,063,743 | 11/1962 | Kylen | 416/244 R |
| 3,143,366 | 8/1964 | Nichols | 403/365 |
| 3,413,926 | 12/1968 | Ayson | 403/260 |
| 4,207,664 | 6/1980 | Zoula | 29/264 |
| 4,303,377 | 12/1981 | Schwartzman | 417/408 |
| 4,358,253 | 11/1982 | Okano et al. | 417/407 |

Primary Examiner—Carlton R. Croyle
Assistant Examiner—Jeffrey A. Simenauer
Attorney, Agent, or Firm—Burns, Doane, Swecker & Mathis

[57] ABSTRACT

An exhaust-gas turbocharger has a bearing system which is positioned between a compressor impeller and a turbine wheel which are positioned on respective ends of a rotor shaft. The compressor impeller is attached to the rotor-shaft via an intermediate bush. A conically mating fit, at one end of the intermediate bush directly adjacent to the bearing, serves to attach this intermediate bush to a shaft-stub of the rotor shaft. A frictionally-locked press fit serves, at the other end of the intermediate bush, to attach the compressor impeller to the intermediate bush, in a manner which transmits torque.

2 Claims, 1 Drawing Figure

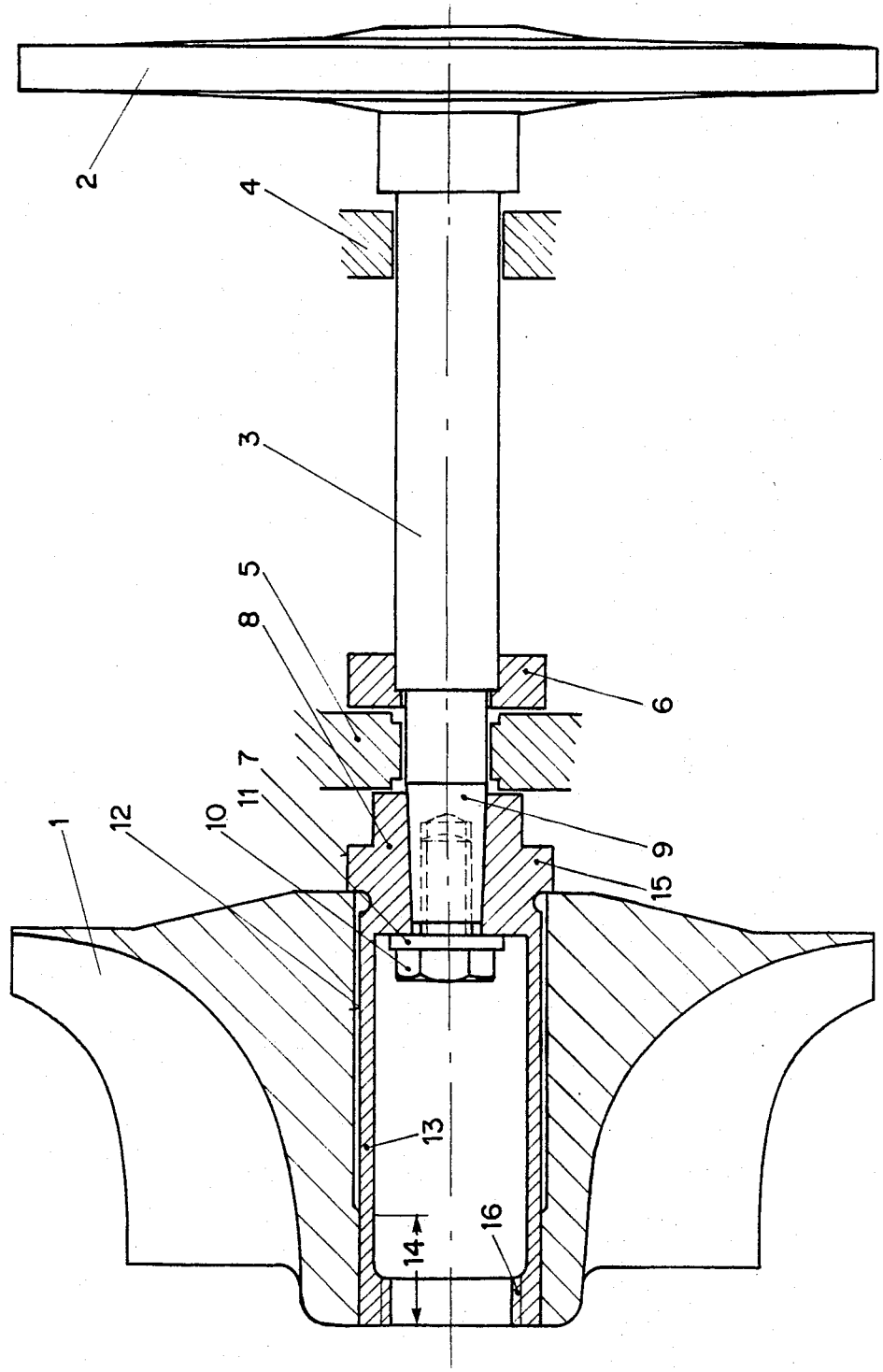

EXHAUST-GAS TURBOCHARGER WITH A BEARING SYSTEM LOCATED BETWEEN THE TURBINE AND THE COMPRESSOR

This application is a continuation of application Ser. No. 405,567 filed Aug. 5, 1982, now abandoned.

BACKGROUND AND SUMMARY OF THE PRESENT INVENTION

The present invention relates generally to an exhaust-gas turbocharger. More specifically, the present invention relates to an exhaust-gas turbocharger having a bearing system located between a turbine and a compressor.

In turbochargers provided with internally-fitted bearing systems, the shaft diameter at the bearing points must be kept small, in order to minimize the frictional losses in the bearings. In order to be able to use inexpensive one-piece bushes as bearings, one end of the shaft must be unoccupied during the assembly operation, meaning that one of the two rotors cannot be attached to the shaft until the latter has been pushed through the bearing bushes, which are not of the split type. This rotor is, as a rule, the compressor impeller, since the turbine wheel is customarily welded to the shaft, because the high operating temperatures to which it is subjected, would prohibit a shrink fit. The attachment of the compressor impeller to the shaft is effected by a shrink fit, or by a press fit which, during repair work, can be released without major difficulty. In addition, this fit facilitates the adjustment, during the assembly operation, of the axial play of a plane surface on the shaft with respect to the bearing. This adjustment permits the required accurate positioning of the compressor impeller in the casing.

In a known design of a press-fit attachment of a compressor impeller to a shaft, an intermediate bush is used. The bush seats, by means of a cone, on the unoccupied end of the shaft and simultaneously serves, by use of an end face, which faces towards the bearing, to limit the axial play of the shaft and to accurately position the compressor impeller with respect to its casing. The compressor impeller sits on this intermediate bush, by a cylindrical press fit. In this design, the shaft-stub, on which the intermediate bush sits, is virtually as long as the intermediate bush itself. The conical surfaces between the shaft and the intermediate bush on the one hand, and the cylindrical press-fitting surface between the intermediate bush and the hub of the compressor impeller on the other hand, extend, at the unoccupied end of the shaft-stub, over only a portion of the length of the hub, preferably over approximately a quarter of this length. A screw, with a washer, provided on the end face of the shaft, serves to secure this attachment axially.

An internal thread, which is provided at the end face of the intermediate bush, and into which a forcing-off screw is inserted, is used in order to pull the intermediate bush from the shaft, together with the compressor impeller.

The arrangement of the cylindrical press-fitting surface for securing the compressor impeller to the unoccupied end of the intermediate bush, that is to say, at the intake end of the compressor impeller, results inevitably from the fact that the hub bore at the rear end of the compressor impeller would expand by an excessive amount, due to the centrifugal force and also, in the case of light-alloy impellers, due to the heating caused by the work of compression, especially at comparatively high pressure-ratios.

The use of an intermediate bush entails the advantage that it can be pulled from the shaft, together with the compressor impeller, as often as desired, without incurring any risk of damaging the attachment.

One disadvantage of this form of construction is that the long shaft-end is, on the one hand, comparatively heavy, while on the other hand its comparatively small diameter renders it insufficiently stiff, to prevent large radial deflections from occurring. Such deflections occur in the event of shockloads and at critical rotation speeds, and necessitate a correspondingly large clearance between the compressor impeller and the casing. In this regard, a particularly dangerous effect is due to the third critical rotation speed, which gives rise to large deflections when the mass is large in proportion to the thin shaft-end, and correspondingly gives rise to large curvatures of the shaft, which can hence come dangerously close to the operating speed. Even small alignment errors in the press fit can act in the same sense. These small errors are capable of giving rise to larger eccentricities of the center of gravity of the compressor impeller, this being particularly true in the case of compressor impellers for high pressure ratios, which are long in the axial direction. A further disadvantage of this form of design resides in the fact that tolerance-related difficulties are created by the coaxial double press-fit within the same longitudinal region.

The present invention, arose from the object of designing the attachment of the compressor impeller to the shaft, in an exhaust-gas turbocharger of the type initially described, in such a manner that the abovementioned disadvantages of the known design are thereby avoided.

BRIEF DESCRIPTION OF THE DRAWING

In the text which follows, the subject of the invention is described in more detail, by reference to an illustrative embodiment which is represented in the drawing.

DETAILED DESCRIPTION OF THE PREFERRED EMBODIMENT

The single FIGURE of the drawing represents, in a simplified manner, a rotor of an exhaust-gas turbocharger. A centrifugal compressor impeller 1 having a central bore and an axial turbine wheel 2, are seated on respective ends of a shaft 3. The turbine wheel 2 is welded to the shaft, preferably by friction-welding, whereas the compressor impeller is attached to the shaft in a manner which permits disassembly. Two bearings 4 and 5 are indicated diagrammatically, with these bearings being provided between the turbine wheel 2 and the compressor impeller 1. To limit the movement play of the rotor in the axial direction, a setting collar 6 is used. On the one side, this collar 6 rests against a shoulder of a step on the shaft 3 and, on the other side, the collar rests against an end face of the bearing 5. The intermediate bush 7 is made thicker, on the shaft side, to form a hub 8 with a conical bore and seats, by this conical bore, on a conical shaftstub 9 of the shaft 3. The intermediate bush 7 is secured in the axial direction by a screw 10 and a washer 11.

The compressor impeller 1 seats on the long cylindrical surface 12 of the intermediate bush 7 in a front, thin-walled portion 13 of the intermediate bush. In particular, the compressor impeller 1 seats on the long cylindrical surface 12 by its front portion, which is a press fit length 14, in the region of the air inlet. The press fit length 14 transmits torque, so that any other elements for transmitting torque are superfluous. The rear end face of the compressor impeller 1 rests against a plane end face of a shoulder 15 in the region of the hub 8.

An internal thread 16 is located at the front, open end of the intermediate bush 7, this thread being used to force off the intermediate bush, together with the compressor impeller, in order to disassemble the rotor. The shaft can then be pulled out of the bearings, with the turbine wheel which is welded to it.

The advantage, in the operational sense, of this attachment between the shaft 3 and the compressor impeller 1, which is customarily made from light alloy, compared to the form of design initially described, resides in the fact that the out-of-balance forces, which excite vibration and which result from unavoidable manufacturing inaccuracies, are less critical with regard to resonance, due to the smaller mass of the compressor impeller 1 and the shaft-stub 9. In this sense, it is also advantageous that the compressor impeller 1 is supported on the stiff intermediate bush, instead of on the more flexible shaft 3, as in the previously mentioned design. In addition, the effects of any alignment errors which may be present are less powerful, since the conical shaft-seat is located nearer to the center of gravity of the impeller 1. Sufficient space for a fastener such as a powerful screw 10, for pressing the intermediate bush 7 onto the conical shaft-stub 9, is also available inside the intermediate bush. Furthermore, the two press fits do not influence each other, so that the stresses in the material are lower, and the dimensional tolerances can be adhered to more reliably. Since the shaft 3 is shorter, it also becomes less expensive to manufacture.

Various modifications and alterations to the above-described specific embodiment will be apparent to those skilled in the art. Accordingly, the foregoing detailed description should be considered exemplary in nature and not as limiting to the scope and spirit of the invention as set forth in the appended claims.

PARTS

1 Compressor impeller (centrifugal)
2 Turbine wheel (axial)
3 Shaft
4 Bearing
5 Bearing
6 Setting collar
7 Intermediate bush
8 Hub
9 Conical shaft-stub
10 Screw
11 Washer
12 Long cylindrical surface of 7
13 Thin-walled portion of 7
14 Length of the press fit
15 Shoulder of the hub 8
16 Internal thread

What is claimed is:

1. An exhaust gas turbocharger with a turbine shaft supported by a plurality of bearing arrangements, comprising: a turbine wheel fixedly mounted on one end of said shaft and an impeller wheel releasably mounted at the other end of said shaft, said impeller wheel having a central bore, a front inlet side and a rear face, the other end of the turbine shaft having a conical shaft stub, an intermediate bushing for connecting said impeller wheel to said shaft, said intermediate bushing including a solid hub portion positioned adjacent said rear face and a thin-walled, cylindrical portion extending axially from said hub portion to said front inlet side through said central bore, said hub portion having a conical bore which receives said conical shaft stub, an axially extending screw in the hub portion of the intermediate bushing for securing said intermediate bushing to said conical shaft stub, whereby said hub portion is positioned between the center of gravity of said impeller wheel and one of said plurality of bearing arrangements adjacent said impeller wheel; said impeller wheel being secured along a first exterior surface of the cylindrical portion in a compression fit at the front inlet side of the impeller wheel over a first length of the cylindrical portion which is short relative to total length of the cylindrical portion; a remaining length of the cylindrical portion being spaced apart from said central bore of the impeller wheel facing said remaining length of the cylindrical portion so as to define a ring shaped cylindrical gap.

2. An exhaust gas turbocharger according to claim 1 wherein the cylindrical portion is provided at said front inlet side with interior threads for receiving a forcing-off screw.

* * * * *

UNITED STATES PATENT AND TRADEMARK OFFICE
CERTIFICATE OF CORRECTION

PATENT NO. : 4,538,969
DATED : September 3, 1985
INVENTOR(S) : Hansruedi Ammann, et al.

It is certified that error appears in the above-identified patent and that said Letters Patent is hereby corrected as shown below:

On Page 1 of the patent, before the section designated "Foreign Application Priority Data", please insert the following section:

-- Related U.S. Application Data

Continuation of Ser. No. 405,567 filed Aug. 5, 1982, now abandoned. --

Signed and Sealed this

Fourteenth Day of January 1986

[SEAL]

Attest:

DONALD J. QUIGG

Attesting Officer

Commissioner of Patents and Trademarks